March 31, 1953     C. M. McALLISTER     2,633,453
LIQUID CLARIFICATION PROCESSES AND SYSTEMS
Filed Sept. 24, 1947     2 SHEETS—SHEET 1
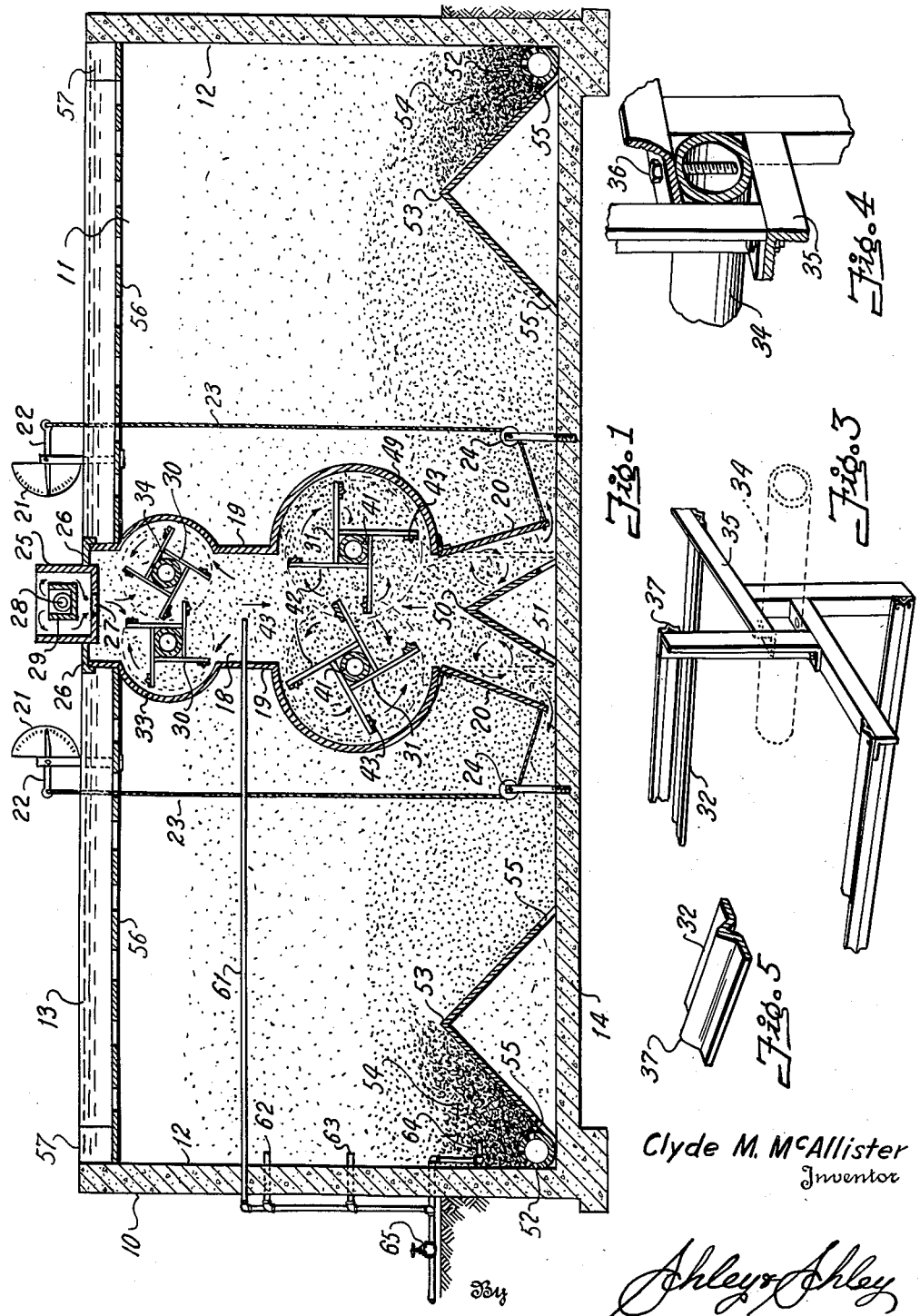
Clyde M. McAllister
Inventor
Ashley & Ashley
Attorneys

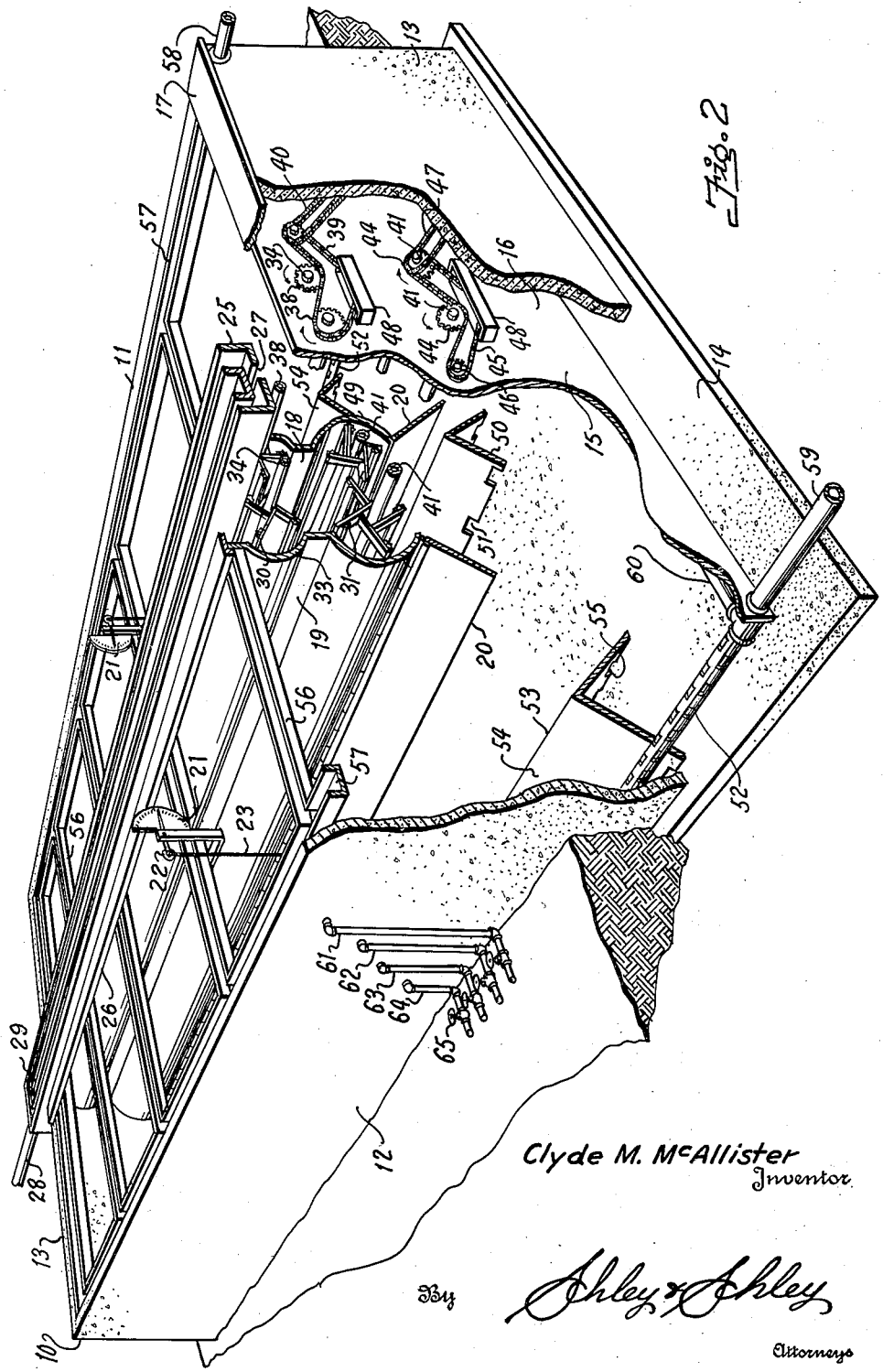

Patented Mar. 31, 1953

2,633,453

UNITED STATES PATENT OFFICE 2,633,453

LIQUID CLARIFICATION PROCESSES AND SYSTEMS

Clyde M. McAllister, Waco, Tex., assignor to The Majax Co., Waco, Tex., a corporation of Texas Application September 24, 1947, Serial No. 775,763

13 Claims. (Cl. 210—16)

This invention relates to new and useful improvements in liquid clarification processes and systems.

As is well-known, liquids are clarified by precipitation, agitation and settling steps which may be combined in various and sundry manners to coagulate and separate the impurities or particles of turbidity from the liquids by flocculation and sedimentation. These liquids include water, tradewastes, sewage, etc. Precipitation is created by the use of any of the common precipitating agents which are ordinarily added to the liquids prior to their treatment in the agitation step. When precipitation first occurs, the particles of turbidity are very minute and, frequently, are no larger than the point of a pin. The step of agitation brings the particles into contact with one another whereby said particles coalesce to form fewer and larger particles. The latter settle when their specific gravity increases sufficiently and the same are usually caught in a sludge trap for removal in any suitable manner.

Conventional clarification or purification plants have the undesirable characteristics of requiring the use of large quantities of chemicals or precipitating agents and a prolonged detention of the liquids in order to adequately treat the same for their intended purpose. In part, this is largely due to the lack, or improper control, of floc formation whereby the precipitating agent is spent or rendered inactive prior to contacting an appreciable and/or maximum quantity of liquid. Sometimes, the precipitating agent is embedded in the floc and settles therewith without expending all of its coagulating properties. Thus, excessive periods of time and quantities of precipitating agents are necessary to reduce the turbidity of the liquid being treated to the desired degree.

Therefore, one object of the invention is to provide an improved process of clarifying liquids wherein flocculation is carried out with a minimum quantity of precipitating agent and in a relatively brief period of time.

An important object of the invention is to provide an improved liquid clarification process wherein flocculation is controlled so as to produce flocs of agglomerated impurities or particles of turbidity having optimum size and weights so as to make possible substantially complete efficacious sedimentation thereof.

A particular object of the invention is to provide an improved liquid clarification process, of the character described, wherein the liquid is mechanically agitated subsequent to the addition of a precipitating agent or agents thereto, and wherein the impurities or particles of turbidity as well as small or lightweight flocs are detained or suspended in the zone of agitation so as to intimately contact said particles and flocs with one another and with newly-admitted particles, whereby the same are coagulated to form flocs of sufficient weight to overcome the force of said agitation zone and settle or escape therefrom.

Another object of the invention is to provide an improved process, of the character described, wherein a counter-current flow is set up within the agitation zone so as to create a substantially quiescent slurry or suspension of flocculent matter through which under-developed flocs must filter before escaping from said zone, whereby the under-developed flocs collide and agglomerate with each other.

A further object of the invention is to provide an improved process, of the character described, wherein the degree of mechanical agitation may be varied in accordance with the rate of flow to adequately treat a liquid for its intended purpose irrespective of variations in the turbidity of the liquid and the type and quantity of precipitating agent employed.

Still another object of the invention is to provide an improved system of clarifying liquids having a flocculation or separation zone wherein mechanical agitators are arranged in such manner as to retard the passage of flocculent matter therethrough and thereby assure thorough contacting and coagulation of the impurities or particles of turbidity.

A still further object of the invention is to provide an improved liquid clarification system having mechanical agitators arranged in pairs for receiving therebetween the flow of liquid to be treated whereby flocculent matter is detained and agglomerated without interrupting the liquid flow.

Another object of the invention is to provide an improved system, of the character described, wherein the agitators are superimposed with the lower agitators being revolved in a direction opposite to the flow of liquid, whereby a counter or reverse current is created within the liquid for causing suspension of under-developed floc so as to assure substantially complete formation thereof.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a transverse, vertical, sectional view of an apparatus for carrying out the invention, Fig. 2 is a perspective view of the apparatus, with portions in sections, Fig. 3 is a perspective view of a portion of one of the agitators, Fig. 4 is an enlarged, detailed view showing the mounting of one of the agitators, and Fig. 5 is a perspective view of a portion of one of the agitator blades.

In the drawings, the numeral 10 designates an apparatus for clarifying liquids, such as water, trade-waste, sewage, etc., and includes a tank or vessel 11 which has been illustrated as being rectangular but which may be square or of any desired shape. The tank 11 has upright side walls 12, end walls 13 and a substantially flat bottom wall 14. Although these walls may be formed of any suitable material, the same are preferably constructed of concrete. An upright partition 15 extends transversely across one end of the tank 11 and has its ends connected to the side walls 12 so as to provide a compartment 16 at one end of said tank. As will be hereinafter more fully explained, suitable motors (not shown) and drive connections are disposed within the compartment 16. The top of the compartment is preferably closed by a suitable plate or closure member 17.

Extending longitudinally and centrally of the tank 11 is an agitation chamber or zone 18 which is preferably formed by substantial upright partitions or walls 19, of metal or other suitable material. The end of the partitions are connected to the transverse partition 15 and the opposite end wall of the tank, while the lower marginal edges of said partitions terminate above the tank bottom 14 and have coextensive closure members or gates 20 hinged or otherwise pivotally secured thereto so as to depend therefrom. Communication between the chamber 18 and the tank is provided by the outlets formed by the pivoted gates 20 which are of such height as to close said outlets in conjunction with the tank bottom when said plates are in a vertical or upright position. For indicating the position of the gates 20, a pair of indicators 21 are positioned at the top of the tank externally of the partitions 19 and have their pivoted arrows or hands 22 connected to the lower portion of said gate by suitable flexible cables 23, which pass around idler rollers 24 carried by the tank bottom.

An inlet weir or trough 25, which is of channel or U-shape in cross-section, is disposed at the upper end of the agitator chamber 18 intermediate its walls 19 and extends throughout the length of said chamber with its end portions supported by one of the end walls 13 of the tank and the transverse partition 15. The spaces between the weir 25 and the chamber walls are closed by a pair of suitable flanged plates or strips 26. A substantially co-extensive slot or elongated opening 27 is formed in the bottom of the weir for establishing communication between said weir and the agitation chamber and thereby provide an inlet for the latter. The influent is introduced into the weir by means of a suitable pipe 28 which extends through one end wall of said weir and discharges into a small complementary trough 29 disposed within the inlet weir and overlying its slot 27. Although the small trough 29 extends throughout the length of the inlet weir 25, the former is of less height and width so as to be spaced from the bottom and side walls of the latter. Due to this arrangement, the influent admitted by the pipe 28 fills the small trough 29 and overflows throughout the length of said trough into the inlet weir, from which said influent is discharged and evenly distributed throughout the agitation chamber by means of the slot 27.

For agitating the liquid flowing through the chamber 18 and coagulating the impurities or particles of turbidity entrained by said liquid, coextensive pairs of mechanical agitators 30 and 31 are disposed horizontally within said chamber in superimposed parallel relation between the inlet and the outlets thereof. The upper pair of agitators 30 are disposed in close proximity to the inlet weir 25 and to each other, whereby their blades 32 intermesh upon rotation. The left-hand agitator 30 rotates in a clockwise direction while the right-hand agitator 30 rotates in a counter-clockwise direction, whereby said agitators turn toward each other in a downwardly direction and with the flow of liquid through the agitation chamber. For accommodating the agitators 30, which have a combined width greater than the width of the chamber, the walls of said chamber are curved or bowed vertically outwardly throughout their lengths to provide a longitudinal enlargement 33. Due to this arrangement, a rotary or centrifugal effect is provided by the upper agitators, which tends to force the liquids downwardly. Each upper agitator includes an axial shaft 34 having tangential arms 35 for supporting its blades 32. As is clearly shown in Figs. 3 and 4, the arms 35 are preferably formed of angle bars and have their inner ends bolted or otherwise secured to one another in surrounding relation to the shaft 34. A bolt 36 extends through and fastens a pair of the arms to the shaft. The blades 32 are secured to the outer end portions of the arms in parallel relation to the leading surfaces of said arms and are preferably formed with a co-extensive, medial rib or ridge 37 for adding rigidity thereto. Each agitator is preferably formed entirely from metal and its shaft is preferably tubular. The ends of each agitator shaft are journaled in one of the end walls of the tank and the transverse partition 15, projecting through the latter and having a sprocket 38 mounted thereon within the compartment 16. An endless chain 39 passes under the right-hand sprocket and over and around the left-hand sprocket 38 for driving the same in the desired direction. The chain 39 is driven by a chain and sprocket arrangement 40 which is connected to a motor (not shown) disposed in said compartment.

The lower agitators 31 are substantially identical to the upper agitators 30 and include parallel, axial shafts 41 having tangential arms 42 secured thereto for supporting co-extensive blades 43. The shafts 41 are journaled in the tank end wall 13 and partition 15 and have sprockets 44 mounted upon their projecting end portions. A chain 45 passes over and around the right-hand sprocket 44, under the left-hand sprocket and over an idler sprocket 46 disposed to the left of said latter sprocket, whereby the right-hand shaft is driven in a clockwise direction and the left-hand shaft in a counter-clockwise direction. Thus, the lower agitators turn away from each other when viewed from above. A chain and sprocket arrangement 47, similar to the chain and sprocket arrangement 40, have driving connection with the right-hand sprocket 44 and a motor (not shown) which is mounted in the compartment 16. If desired, oil pans 48 may be mounted below the lower flights of the chains 39 and 45.

The lower agitators 31 are of greater diameter than the upper agitators and are spaced a greater distance apart, whereby their blades 43 barely mesh upon rotation. The lower agitators are disposed immediately above the chamber outlets, formed by the pivoted gates 20, and are preferably spaced from the upper agitators. A longitudinal enlargement 49, similar to the enlargement 33, is formed in the lower portion of the chamber for accommodating the agitators 31 by curving or arcing the walls of said chamber vertically outwardly. Due to the rotation of the lower agitators in a direction opposite to the flow of liquid through the chamber, a reverse current is set up within the lower portion of said chamber for resisting or retarding the discharge of turbid particles or solids therefrom. As will be hereinafter explained, the counter-current directs small suspended particles upwardly within the chamber without interfering with the flow of liquid therethrough. Immediately below the agitators 31 and between the pivoted gates 20, an inverted V-shaped deflector 50 extends throughout the length of the chamber for dividing and directing the flow of liquid to the outlets of said chamber. The deflector 50 has slots or openings 51 in its lower edge portions, or is otherwise spaced from the bottom of the tank, to facilitate the removal of sludge.

The tank 11 functions as a sedimentation zone or settling chamber and has a perforated pipe 52 adjacent the bottom of each side wall 12 and extending throughout its length for withdrawing sludge collected in said tank. An inverted V-shaped deflector 53, similar to the deflector 50, is disposed adjacent and inwardly of each pipe 52 to provide sludge concentration areas 54 contiguous to each pipe. To facilitate the withdrawal of sludge from the entire bottom of the tank, the deflectors 53 are preferably spaced a slight distance above said bottom, or have slots or openings 55 cut in their lower edge portions. Clarified liquid is withdrawn from the top of the tank by means of slotted weirs or troughs 56 which extend across the upper end of the tank between the chamber walls 19 and the side walls 12 of said tank. The outer ends of the weirs 56 communicate with longitudinal discharge troughs 57 which are carried by and extend throughout the length of the tank side walls. A discharge pipe 58 conducts the clarified liquid from each trough 57, while a common discharge pipe 59 is provided for the perforated sludge pipes 52 which are inter-connected by a transverse pipe 60. A plurality of sample lines 61, 62, 63, and 64 extend through one side wall of the tank, with the uppermost line 61 communicating with the agitation chamber 18 between the upper and lower agitators and the lowermost line 64 depending within sludge concentration area 54 above one of the perforated pipes 52. A suitable manual control valve 65 is connected in each sample line externally of the tank for controlling the withdrawal of samples.

The apparatus described hereinbefore is adaptable to various uses, such as water purification, water softening, turbidity removal and clarification of surface-supplied waters, removal of alkalinity, removal of silica, removal of fluorides, treating and precipitation of rapid trade-wastes and in connection with sewage disposal systems. In the operation of the apparatus, the desired chemical or precipitating agent is added to the liquid in the pipe 28 or the small trough 29 and the mixture overflows into the inlet weir 25. From the latter, the liquid flows through the slot 27 into the upper end of the agitation chamber 18. It is pointed out that the agitators 30 and 31 are rotated at a relatively low rate of speed and that the lower agitators turn much slower than the upper agitators. As an example, the upper agitators may turn at a rate of from 5 to 20 R. P. M. and the lower agitators at a rate of 1 to 10 R. P. M. Since the liquid is withdrawn from the tank by the slotted weirs 56 which are disposed at the upper end of said tank, the agitation chamber and the tank are maintained full of liquid. Due to the even distribution of the influent and the effluent both to and from the chamber and the tank, there is no opportunity for the liquid to short-circuit or channel through said chamber or tank. Thus, uniform and thorough treatment of the liquid is assured.

The liquid entering the agitation chamber is gently agitated and directed downwardly within said chamber by the action of the upper agitators 30. The impurities or particles of turbidity, which are quite small in size, are brought into contact with one another so as to coagulate said particles and form fewer and larger particles. The rotary or centrifugal action set up by the upper agitators has little or no effect upon the movement of the liquid through the chamber but merely acts upon the turbid particles. The coagulated particles are next exposed to the action of the lower agitators which resist or retard further downward movement of said particles. The reverse or counter-current flow set up by the lower agitators tends to direct the smaller particles upwardly, whereby the same are suspended in the space between the upper and lower agitators. Although the heavier particles pass below the agitators 31, the counter-current created by the latter is of sufficient force to prevent all but the heaviest particles from being discharged or seeping into the sedimentation tank. Thus, a substantially quiescent slurry or suspension of flocculent matter is created within the chamber and particularly the lower portions thereof. Manifestly, under-developed flocs must filter through this slurry or suspension in passing to the sedimentation tank or zone and thereby intimately contact other flocs and particles and agglomerate until of sufficient weight to overcome the force of the upward current set up by the lower agitators. It is pointed out that the concentration or size of the particles and flocs progressively increase in direct relation to their weights. During this agitation of the turbid particles, the liquids flow continuously through the agitation chamber and into the sedimentation tank by means of the outlets formed by the pivoted gates 20. The heavier particles and some of the lightweight particles pass into the tank with these liquids to form a slurry or suspension of turbid particles within the lower portion thereof.

Due to the pivoting of the gates 20, the size or area of the outlets formed by said gates is varied in accordance with the flow of liquid through the apparatus and this, in turn, is in accordance with the rate of withdrawal through the discharge pipe 57. Under a low rate of flow, the gates are opened only a slight distance, but open to a greater extent upon an increase in the rate of flow to permit the passage of a greater amount of liquid through the outlets. In addition to varying the size of the outlets, the gates also function to vary the size of the agitation chamber. Under high rates of flow, the gates swing outwardly and upwardly so as to enlarge the lower portion of the agitation chamber and thereby provide a greater area for the preliminary treatment of the liquid. Manifestly, this construction increases the capacity of the agitation chamber and permits the treatment of relatively large volumes of liquid in a short period of time without impairing the efficiency of the apparatus. Since the position of the gates is controlled by the rate of flow, the latter may be ascertained or calculated by observing the indicator 21.

As set forth hereinbefore, the liquid discharged from the agitation chamber is evenly distributed throughout the area of the sedimentation tank due to the co-extensive nature of the gates 20. Although a slurry or suspension of flocculent matter is formed in the lower portion of the sedimentation tank, it is manifest that the same will quickly settle and collect in the areas 54 immediately above and adjacent the sludge discharge pipes 52. Any solids that collect on the bottom of the tank will be drawn into the sludge concentration areas due to the spacing of the deflectors 50 and 53 above said tank bottom. Due to the large area of the tank which decreases the velocity or rate of flow so as to precipitate the solids, only clarified, treated liquid rises to the top of said tank and is withdrawn through the weirs 56. It is preferable to continuously withdraw the concentrated sludge through these pipes 52.

Due to the fact that the flocculent matter can be held to the desired suspension either by the action of the mechanical agitators alone or in combination with the rate of flow, it has been found that the detention time of the liquid being treated may be varied in accordance with the turbidity thereof and the clarification desired. In view of the slurry or suspension of underdeveloped flocculent matter in the lower portion of the agitation chamber, it is unnecessary to maintain a deep sludge filter in the tank and the concentrated sludge may be continually removed. Thus, no sludge accumulates in the tank so as to decompose and give off undesirable gases that cause taste and odor and substantially the entire area of the tank is utilized for settling purposes. Since the formation of floc is controlled in the agitation chamber, the liquid may be clarified with an economical quantity of chemicals or precipitating agents. The latter is contacted by a relatively large volume of liquid within the agitation chamber prior to its escape into the sedimentation tank whereby its coagulating properties are utilized to the fullest extent.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The process of clarifying liquid which includes, passing a precipitating agent and turbid liquid through an agitation zone, mechanically creating a counter-current within the agitation zone in a direction opposite to the passage of the liquid through said zone for setting up a suspension of turbid particles and under-developed flocs therein whereby a slurry is formed through which flocculent matter must pass so as to assure thorough coagulation thereof, withdrawing liquid and fully developed flocs from the lower portion of said agitation zone and directing the same to a sedimentation zone, and withdrawing treated liquid from the upper portion of the sedimentation zone.

2. The process of clarifying liquid which includes, passing a precipitating agent and liquid to be treated downwardly through a zone of mechanical agitation, establishing and maintaining a slurry of turbid particles and under-developed flocs in the lower portion of the agitation zone by directing said particles and flocs upwardly therein, directing liquid from the bottom of said zone horizontally and upwardly through a sedimentation zone, withdrawing treated liquid from above the sedimentation zone, collecting solids at the bottom of said sedimentation zone, and removing sedimented solids from below the latter zone.

3. The process of clarifying liquid which includes, passing a precipitating agent and turbid liquid through an agitation zone, mechanically creating a counter-current within the agitation zone in a direction opposite to the passage of the liquid through said zone for setting up a suspension of turbid particles and under-developed flocs therein whereby such particles and flocs are detained in said zone so as to be agglomerated with other particles and flocs to produce flocs having sufficient weight to overcome the countercurrent, directing liquid from the lower portion of said zone to a sedimentation zone, withdrawing treated liquid from above the sedimentation zone, and withdrawing solids from below said zone.

4. A liquid clarification system including, an agitation chamber having an inlet and an outlet for accommodating a flow of liquid and precipitating agent therethrough, a sedimentation tank communicating with the outlet of the chamber for receiving liquid therefrom, mechanical agitators disposed within said chamber, the agitators adjacent the outlet being revolved in a direction opposite to the flow of the liquid so as to create a reverse current within said chamber toward its inlet for setting up a slurry of turbid particles and under-developed flocs therein, means for withdrawing treated liquid from the upper portion of the tank, and means for removing solids from the lower portion of said tank.

5. The system set forth in claim 4 wherein the mechanical agitators are arranged in superimposed pairs adjacent the margins of the chamber whereby the liquid flow is therebetween.

6. The system set forth in claim 4 wherein the agitators are arranged in coacting pairs with the agitators of each coacting pair being disposed on opposite sides of the chamber in substantial alignment with each other, the agitators adjacent the outlet being revolved at a lower rate of speed than the other agitators whereby the reverse current is gentle and agglomerates the larger turbid particles without breaking up the same.

7. A liquid clarification system including, an agitation chamber having an inlet at its upper end and an outlet at its lower end for accommodating a flow of liquid and precipitating agent downwardly therethrough, a sedimentation tank communicating with the outlet of the chamber for receiving liquid therefrom, superimposed revolving pairs of agitators disposed within said chamber, means for revolving each pair of agitators about horizontal axes and in opposite directions toward each other, the pairs of agitators being disposed in spaced relation, the upper pair being adjacent the inlet and the lower pair adjacent the outlet, said lower pair of agitators being revolved in directions opposite to the upper agitators and the flow of liquid so as to create an upward counter-current within said chamber for setting up a suspension of turbid particles and under-developed flocs in the lower portion of said chamber through which liquid must pass in flowing from the chamber to the sedimentation tank, means for removing solids from the lower portion of said tank, and means for removing clear liquid from the upper portion of said tank.

8. The system set forth in claim 7 including, means responsive to the rate of flow through the agitation chamber for varying the size of the outlet.

9. The system set forth in claim 7 wherein each pair of agitators are disposed on opposite sides of the chamber and intermesh with each other, the chamber being enlarged to accommodate the pairs of agitators and direct the flow of liquid between the agitators of each pair.

10. In a liquid clarification system, an agitation chamber having upright side walls, an inlet at the top of the chamber, an outlet at the bottom of said chamber, horizontal revolving agitators mounted in said chamber in spaced coacting pairs and extending throughout the length thereof, the side walls being complementarily recessed to receive the agitators, the lower pair of agitators being revolved in a direction opposite to the flow of liquid and precipitating agent through said chamber to create an upward counter-current for establishing a slurry of turbid particles in the lower portion of said chamber.

11. A liquid clarification system including, an agitation chamber having an inlet and an outlet for accommodating a flow of liquid and precipitating agent therethrough, a sedimentation tank communicating with the outlet of the chamber for receiving liquid therefrom, mechanical agitators disposed within said chamber, the agitators adjacent the outlet being revolved in a direction opposite to the flow of the liquid so as to create a reverse current within said chamber toward its inlet for setting up a slurry of turbid particles and under-developed flocs therein, means responsive to the rate of flow through said chamber for varying the size of the outlet, means for withdrawing treated liquid from the upper portion of the tank, and means for removing solids from the lower portion of said tank.

12. A liquid clarification system including, an agitation chamber having an inlet and an outlet for accommodating a flow of liquid and precipitating agent therethrough, a sedimentation tank communicating with the outlet of the chamber for receiving liquid therefrom, mechanical agitators disposed within said chamber, the agitators adjacent the outlet being revolved in a direction opposite to the flow of the liquid so as to create a reverse current within said chamber toward its inlet for setting up a slurry of turbid particles and under-developed flocs therein, a pivoted closure adjacent the outlet and responsive to the rate of flow through said chamber for controlling the flow from said chamber to said tank, means for withdrawing treated liquid from the upper portion of the tank, and means for removing solids from the lower portion of said tank.

13. A liquid clarification system including, an agitation chamber having an inlet at its upper end and outlet at its lower end for accommodating a flow of liquid and precipitating agent downwardly therethrough, a sedimentation tank communicating with the outlet of the chamber for receiving liquid therefrom, superimposed revolving pairs of agitators disposed within said chamber, means for revolving each pair of agitators about horizontal axes and in opposite directions toward each other, the pairs of agitators being disposed in spaced relation, the upper pair being adjacent the inlet and the lower pair adjacent the outlet, said lower pair of agitators being revolved in directions opposite to the upper agitators and to the flow of liquid so as to create an upward counter-current within said chamber for setting up a suspension of turbid particles and under-developed flocs in the lower portion of said chamber through which liquid must pass in flowing from the chamber to the sedimentation tank, a gate pivoted adjacent the outlet for controlling the passage of liquid from said chamber to said tank in accordance with the rate of flow through said chamber, means for removing solids from the lower portion of said tank, and means for removing clear liquid from the upper portion of said tank.

CLYDE M. McALLISTER.

REFERENCES CITED

The following references are of record in the file of this patent:

UNITED STATES PATENTS

| Number | Name | Date |
|---|---|---|
| 675,751 | Moustier | June 4, 1901 |
| 850,503 | Sutro | Apr. 16, 1907 |
| 1,030,366 | Winters | June 25, 1912 |
| 1,684,822 | Green | Sept. 18, 1928 |
| 1,752,795 | Hoover et al. | Apr. 1, 1930 |
| 2,128,569 | Velz | Aug. 30, 1938 |
| 2,160,838 | Van N. Dorr | June 6, 1939 |
| 2,179,246 | Applebaum | Nov. 7, 1939 |
| 2,245,587 | Hughes | June 17, 1941 |
| 2,264,139 | Montgomery et al. | Nov. 25, 1941 |
| 2,268,726 | Tark | Jan. 6, 1942 |
| 2,295,714 | Clark | Sept. 15, 1942 |
| 2,358,736 | Schaaf | Sept. 19, 1944 |
| 2,374,456 | Ravndal et al. | Apr. 24, 1945 |
| 2,385,903 | Winkelmann | Oct. 2, 1945 |
| 2,509,683 | Green | May 30, 1950 |